(12) United States Patent
Ely et al.

(10) Patent No.: US 6,932,879 B2
(45) Date of Patent: Aug. 23, 2005

(54) METHOD OF WELDBONDING

(75) Inventors: Kevin J. Ely, Dublin, OH (US);
Timothy M. Frech, Columbus, OH (US); George W. Ritter, Columbus, OH (US)

(73) Assignee: Edison Welding Institute, Columbus, OH (US)

(*) Notice: Subject to any disclaimer, the term of this patent is extended or adjusted under 35 U.S.C. 154(b) by 359 days.

(21) Appl. No.: 10/218,003

(22) Filed: Aug. 13, 2002

(65) Prior Publication Data

US 2004/0031561 A1 Feb. 19, 2004

(51) Int. Cl.⁷ ................................................. B32B 31/00
(52) U.S. Cl. ........................ 156/87; 156/104; 219/121.6;
219/122; 219/121.64; 219/124.02; 219/121.86;
219/86.1; 219/78.14; 148/516; 148/523;
148/527; 148/535
(58) Field of Search ................ 156/87, 104; 219/121.6,
219/122, 121.64, 124.02, 121.86, 86.1,
78.14; 148/516, 523, 527, 535

(56) References Cited

U.S. PATENT DOCUMENTS

| | | | |
|---|---|---|---|
| 2,726,308 A | | 12/1955 | Cinamon |
| 3,337,711 A | | 8/1967 | Garscia |
| 3,751,626 A | * | 8/1973 | Binger et al. ............... 219/118 |
| 3,967,091 A | | 6/1976 | Vaughan et al. |
| 3,988,561 A | | 10/1976 | Vaughan et al. |
| 4,155,751 A | * | 5/1979 | Herchenroeder ............ 420/585 |
| 4,665,294 A | | 5/1987 | Hira et al. |
| 4,682,002 A | | 7/1987 | Delle Piane et al. |
| 4,684,779 A | * | 8/1987 | Berlinger et al. ...... 219/121.64 |
| 4,924,057 A | | 5/1990 | Puddle et al. |
| 4,925,510 A | | 5/1990 | Hojo et al. |
| 5,232,962 A | | 8/1993 | Dershem et al. |
| 5,240,645 A | | 8/1993 | Strecker |
| 5,346,569 A | * | 9/1994 | Simon .......................... 156/87 |
| 5,626,776 A | * | 5/1997 | Morris, Jr. ............. 219/121.64 |
| 5,859,402 A | | 1/1999 | Maier |
| 6,146,488 A | | 11/2000 | Okada et al. |
| 6,191,379 B1 | | 2/2001 | Offer et al. |
| 6,210,795 B1 | | 4/2001 | Nelson et al. |
| 6,291,792 B1 | * | 9/2001 | Fussnegger et al. ........ 219/118 |
| 6,359,252 B1 | | 3/2002 | Sanjen et al. |
| 6,369,347 B1 | | 4/2002 | Zhao et al. |
| 6,444,947 B1 | * | 9/2002 | Bonss et al. ............ 219/121.63 |
| 6,479,168 B2 | * | 11/2002 | Mazumder et al. ......... 428/659 |
| 6,528,756 B2 | * | 3/2003 | Degawa et al. ........ 219/121.64 |
| 6,703,583 B2 | * | 3/2004 | Menin .................... 219/121.64 |
| 6,706,992 B2 | * | 3/2004 | Hughes ................. 219/121.45 |
| 6,797,915 B2 | * | 9/2004 | Jack ...................... 219/121.64 |
| 2002/0014476 A1 | | 2/2002 | Tsukamoto et al. |
| 2002/0079296 A1 | | 6/2002 | Dijken et al. |

* cited by examiner

*Primary Examiner*—Jeff H. Aftergut
*Assistant Examiner*—Chris Schatz
(74) *Attorney, Agent, or Firm*—Gallagher & Dawsey Co., LPA; Michael J. Gallagher; David J. Dawsey

(57) ABSTRACT

An improved method of weldbonding utilizing inclusion bodies, placed directly between materials to be bonded or included in a weldbonding adhesive. The inclusion bodies maintain a gap between the materials to be welded which provides a gas releasing egress route to disperse the gas and gaseous byproducts produced during welding. This egress route substantially prevents the gases and gaseous byproducts from being expelled through the weld pool and the resultant degradation of the quality of the weld pool, particularly with coated materials, partial penetration welds, and such materials as 6000 series aluminum. The method further comprises an optional step of including a crack-reducing additive, applied either directly to the materials to be welded or included in the adhesive. A laser weldbonding embodiment may use a plurality of phased heat cycles to reduce weld imperfections, and enhance the effects of the adhesive and optional crack-reducing additive.

43 Claims, 4 Drawing Sheets

METHOD OF WELDBONDING

TECHNICAL FIELD

The present invention relates to the field of weldbonding; particularly, to a method of weldbonding articles resulting in improved weld quality.

BACKGROUND OF THE INVENTION

Weldbonding, the process of joining materials with both welding and adhesive, offers numerous advantages over either welding or adhesive technology applied singly to materials joining. Among these advantages are stronger joints that reduce previous structural adhesive bonding limitations such as out-of-plane load-carrying capability, also commonly referred to as peel. Unfortunately, the development of weldbonding processes has been plagued with a number of problems.

The first problem has been the tendency of an adhesive to act as a non-conductive layer between the parts to be welded. One solution to this problem, that of welding only through areas that contain no adhesive, limits the placement of adhesive and substantially increases the labor required in accurate adhesive and weld placement. During manipulation, and particularly during heating, as will be discussed in detail below, adhesive originally placed outside the weld area tends to flow into the weld area, making techniques of excluding adhesive from the weld area problematic at best. Forming the parts to be welded to produce bosses or indentations that allow close material contact outside of an adhesive area can be used, but this requires additional tooling, and may be impractical depending on the design and characteristics of the materials to be joined. A more optimal method, such as that of the instant invention, would make it equally possible to weld through areas that contain adhesive and areas that do not contain adhesive. Such a method minimizes the effect of variations in adhesive application or flow of adhesive during the welding process.

Another approach has been to weld through the adhesive. An electrical shunt to obviate the insulating properties of the adhesive has been employed, as seen in U.S. Pat. No. 3,337,711 to Garscia. Adhesive additives to promote electrical and thermal conductivity; as seen in U.S. Pat. No. 6,146,488 to Okada, et al.; or that of U.S. Pat. No. 5,240,645 to Strecker; have also been used. However, the development of processes for welding through adhesives have themselves introduced complications unrelated to thermal or electrical conductivity that affect the quality of the weld.

The temperatures generated in the welding process produce a plurality of gases and particulates during the formation of the weld. Among these are vaporized elements from the materials themselves; vaporized coatings from the materials to be joined, which often vaporize at temperatures lower than that of the materials to which they are applied; and various vaporized materials and combustion products from the adhesive. In addition to rising towards the top of the weld pool, these materials tend to be expressed outwards through the weld area toward the periphery of the weld area, and their migration can both physically disrupt the weld and lead to inclusions within the weld that weaken the joint.

Various means have been employed in attempts to vent these gases and other byproducts from the weld area. For example, in U.S. Pat. No. 6,359,252 to Sanjeu, et al., an energy beam is directed to drive gaseous by-products away from the weld area. U.S. Pat. No. 5,859,402 to Maier teaches the use of a combined laser and arc welding method that utilizes a laser to remove dielectric material ahead of an arc. Such methods suffer the disadvantage of complexity in the necessity for utilizing secondary beams aside from the main welding technique.

Attempts have also been made to introduce physical spacers to allow a gas egress space between the materials to be joined, as seen in U.S. Pat. No. 4,682,002 to Delle Piane et al. In the first of several embodiments taught by Delle Piane '002, one of the materials to be joined is formed with a channel so that gases will have an egress route away from the weld area. In the second embodiment taught by Delle Piane '002, one or both of the materials to be joined is knurled in a pattern that provides a plurality of such passages. Both methods require machining or forming of the joined materials prior to weldbonding, which adds complexity to the process and may be impractical depending on the design and characteristics of the materials to be joined. The last embodiment taught by Delle Piane '002 involves clamping a formed spacer between the materials to be joined, in the vicinity of the weld area, to cause a physical separation of the materials to be joined and thereby to provide a means for gas egress. This technique requires the additional steps of placing the spacer, securing it during the welding process, and avoiding an obstruction of the venting channel by the securing process. This would be particularly likely when adhesive is used, as the method of Delle Piane '002 is not a weldbonding method and does not account for the potential obstruction to gas flow posed by adhesives in the weld area.

A more optimal method of achieving spacing between the materials to be joined in a weldbonding process is, as in the instant invention, to either incorporate inclusion bodies into the matrix of the adhesive, or alternately, to allow such inclusion bodies to be placed in the space between the materials to be joined along with the adhesive. Such inclusion bodies act to maintain a potential space for gas flow between the materials to be welded and minimize the opportunities for obstruction to gas flow.

This potential obstruction to gas flow due to adhesives in the weld area is a multi-faceted problem. In addition to the problems of gas formation in the area of the weld pool, the temperatures generated in welding processes affect the flow of adhesives in ways that compound the problem of gas generation from combustion of the adhesive. As the temperature in the weld area begins to rise, adhesive in the area surrounding the weld area also begins to rise in temperature. This tends to create a liquefying effect, whereby the viscosity of the adhesive in the vicinity of the weld area declines. The compressive force generated by holding the parts to be welded together therefore tends to press the increasingly less viscous adhesive towards the area of least adhesive density—the weld area. Additionally, the combustion or vaporization of metal, metal coatings, and adhesive tends to draw adhesive into the weld area. Accordingly, an undesirable cycle is created, by which combustion of the adhesive in the weld area tends to draw more adhesive into the weld area, which is in turn consumed in the high temperature weld pool, with the generation of more gas and gaseous by-products. The cycling of this process tends to increase the amount of gas and gaseous by-products produced and exacerbates the need for venting of the gases, lest the weld integrity become ever more degraded if these gases and gaseous byproducts escape through the weld pool. These problems are especially acute when a full penetration weld is not intended, as the gases are deprived of an egress route out the backside of the weld. Accordingly, an optimal adhesive will have sufficient resistance to flow to minimize flow into the weld area upon heating, but sufficient flow to allow gas egress through the adhesive matrix. An ideal material would be a relatively fast curing adhesive that could be substantially cured in the vicinity of the weld area by the welding process itself, yet still allow for gaseous egress.

Welding technologies using various heating phases are well known. However, such exemplars as U.S. Pat. Appl. No. 2002/0014476 to Tsukamoto, et al., and U.S. Pat. Appl. No. 2002/0079296 to Dijken, et al., which are not directed to weldbonding, teach phasing of the laser welding means only to optimize weld joint quality. An optimal phasing of heating cycles, especially in a laser welding context, would not only act to affect such parameters as weld flow and cooling rates, but would adjust the rates and duration of heating cycles so as to burn and remove, or vaporize, organics and other materials from the weld area, substantially cure the weldbonding adhesive in the vicinity of the weld area, and/or to optimally liquefy any weld enhancing additive that was contained in the adhesive or otherwise placed in proximity to the weld area. The utilization of a phase to vaporize or otherwise ablate, organics and other materials from the weld area prior to a welding phase results in improved weld quality.

Such weld enhancing additives, particularly those that are rich in silicon, can be added to weld areas of aluminum components to increase the quality of the weld. The high temperatures of welding tend to liquefy these additives, and they disperse into the weld pool. A recurrent problem has been to place these additives into the weld area, rather than outside the weld area where they would be of no use, and to insure that they are held in the weld area during heating long enough for them to be distributed into the weld pool. An optimal method, such as that of the instant invention, allows the weld additive or additives to be incorporated in the matrix of the adhesive, or alternatively and by way of example and not limitation, to be placed between the materials to be welded or placed otherwise on a surface of the material to be welded in the form of a powder, suspension, wire, tape, or foil.

What the art has needed has been a weldbonding method that allows welding to take place through an adhesive layer but does not require a layer of adhesive under a weld, allows gas and combustion products egress from the weld area without disruption or weakening of the weld and with minimal effect on the adhesive bonding, minimizes adhesive flow into the weld area to decrease the amount of adhesive combusted or vaporized, allows the introduction of weld enhancing additives to the weld area, and provides materials and processes that minimize the tendency of the weld to crack. The instant invention accomplishes these goals by utilizing a novel combination of methods and materials to utilize an adhesive and inclusion bodies that provide for a route of egress for gas and combustion products around the inclusion bodies and through the adhesive layer. Furthermore, the method is designed to minimize the amount of adhesive that is consumed or vaporized during the welding process by curing the adhesive sufficiently to minimize adhesive flow into the weld area during welding, thus minimizing the amount of gas and by-products that need to be vented from the weld area. The adhesive may also be enriched or otherwise utilized with various crack-reducing additives, including silicon enriched materials, that act as additives to improve the quality of the weld. Thus, a simplified method is utilized to minimize gas production, provide a means for venting such gases as are produced, and provide an optional additive element to improve the quality of the resulting weld. Lastly, a variation in welding technique of providing a multiphase heating pattern can be applied to maximize the benefits obtained with the present weldbond method.

With these capabilities taken into consideration, the instant invention addresses many of the shortcomings of the prior art and offers significant benefits heretofore unavailable.

SUMMARY OF THE INVENTION

In its most general configuration, the present invention advances the state of the art with a variety of new capabilities and overcomes many of the shortcomings of prior methods in new and novel ways. In its most general sense, the present invention overcomes the shortcomings and limitations of the prior art in any of a number of generally effective configurations.

In one of the many preferable configurations, the method of weldbonding incorporates, among other steps, applying an adhesive between a first rigid material and a second rigid material, bringing the first rigid material and the second rigid material into close proximity and maintaining their relative positions with a retaining means, sweeping a weld area with a welding means, and providing a plurality of gas release and gap sustaining inclusion bodies between the components. The plurality of gas release and gap sustaining inclusion bodies allow at least one gas generated during the weldbonding process to escape to atmosphere substantially without passing through the weld pool and thereby reducing the quality of the weld. The at least one gas creates at least one passageway around the plurality of gas release and gap sustaining inclusion bodies between the first rigid material component and the second rigid material component allowing the at least one gas to escape to atmosphere. The new and novel concept of a plurality of gas release and gap sustaining inclusion bodies allowing gas to escape the weld area by creating at least one passageway is not limited to the field of weldbonding and may be effectively applied in the general field of welding.

The technology of weldbonding does not require that a weld be made through an adhesive, and, as referenced prior, a good deal of attention has been directed in the past to methods of keeping adhesives out of weld areas. However, these techniques all add various complications to weldbonding that underscore that an optimal weldbonding method, as in the instant invention, will perform well both with, and without, adhesive in the weld area.

If the presence of adhesive in the weld area is not to degrade the practicality and integrity of the welding process, then various properties of the adhesive become very important in the weldbonding process. These properties, by way of example and not limitation, include shelf life, working times, flow characteristics, adhesive strength, and reactions to high temperatures. Generally, both one-part and two-part adhesives may be used in this process. However, one-part adhesives have relatively long curing times and often must be heated to cure, while two-part adhesives have shorter curing times. In general bonding applications, one-part adhesives are often preferred because they have a much longer shelf life than two-part adhesives, however, they both have attributes that make them desirable for use in weldbonding.

As noted, the most efficient weldbonding process involves completing the weld without regard as to whether the weld is penetrating the weldbonding adhesive, or not. To this end, it is necessary to minimize the potential effects of ignition of any adhesive that may be in, or close to, the weld area. One-part adhesives with latent curing additives are particularly prone to ignition when exposed to the welding means. This is true, in part, due to the low resistance to flow of the one-part adhesives. For example, during weldbonding with a one-part adhesive, liquefied adhesive flows into the weld area, thereby fueling the ignition of the adhesive and reducing the weld quality. It is this same low resistance to flow that allows one-part adhesives to be very easy to apply and workable. Fortunately, rapid curing two-part adhesives do not have the tendency to ignite when exposed to the welding source. Additionally, rapid curing two-part adhesives tend to cure in the vicinity of the weld area when exposed to the welding source. Therefore, in one of many preferred embodiments, the best qualities of both one-part and two-part adhesives are combined to form a one-part adhesive that substantially cures in the vicinity of the weld area to prevent the flow of adhesive into the weld area while maintaining a workable viscosity and rapid curing. Such an embodiment may include at least one one-part latent curing agent, at least one two-part curing agent, and at least one viscosity and flow modifier. An adhesive including a mixture of up through approximately 15% two-part curing agent and the balance being one-part curing agent augmented with viscosity and flow modifiers possesses the desired properties described above. Alternatively, the adhesive may be applied, by way of example and not limitation, in a solid form such as a tape.

In addition to minimizing adhesive flow into the weld area, the importance of the presence or absence of adhesive in the weld area is further reduced by providing for a method of venting such gas and gaseous byproducts of the welding process as may occur. These gas and gaseous byproducts include, by way of example and not limitation, vaporized elements from the materials to be joined and from any coating that may be present on the materials. Additionally, these gases and gaseous byproducts could be supplemented, by way of example and not limitation, by combustion or vaporization products from any adhesive or other material that may be in the weld area. The instant invention provides for inclusion bodies between the surfaces of the materials to be joined. These inclusion bodies tend to maintain a gap between the materials to be joined to allow the lateral release of such gas or gaseous byproducts that may be generated.

In addition to manipulation of the tendency of any adhesive to flow into the weld area and the provision for gaseous egress by the plurality of gas release and gap sustaining inclusion bodies, the viscosity and curing properties of the adhesive are important to allowing the escaping at least one gas to create the at least one passageway. The at least one gas is created by vaporization of a plurality of materials during the melting of the rigid material components, any material coatings that may be present, the adhesive, and the plurality of gas release and gap sustaining inclusion bodies. Perhaps the largest contributors to the creation of the at least one gas are the burning of protective coatings applied to the rigid material components, the burning of the adhesive, and the boiling away of alloying elements. For example, aluminum alloys are often coated with a protective layer of chromate that produces gases that must escape the weld area when burned. Similarly, sheet steel often possesses zinc-based coatings. Additionally, magnesium and other elements in aluminum alloy are often vaporized during heating of the alloy, creating gas that must escape the weld area.

The method of substantially controlling the escape of the at least one gas produced during weldbonding is essential in creating a reproducible quality weld. The present invention substantially controls the release of the at least one gas through the use of the plurality of gas release and gap sustaining inclusion bodies. The plurality of gas release and gap sustaining inclusion bodies maintain a separation distance between the first rigid material component and the second rigid material component of between approximately 0.001 inches and approximately 0.020 inches. The separation distance may be varied by changing the size of the inclusion bodies and can vary depending on the desired adhesive thickness as well as the amount of the at least one gas that is expected, among other variables. The plurality of gas release and gap sustaining inclusion bodies may be of virtually any shape. For example, but not limitation, the inclusion bodies may be spherical, cubic, prismatic, cylindrical, conical, pyramidal, frustum sections thereof, and virtually any other volumetric configuration. Further, while the inclusion bodies may be constructed of any number of materials, in one of many preferred embodiments the inclusion bodies are made of silica. When adhesive fills the space between the materials to be joined, the inclusion bodies preserve a potential, rather than an open, channel for gaseous egress, as the matrix of the adhesive will fill the interstices between inclusion bodies. Therefore, the adhesive, as in the instant invention, must be sufficiently flow resistant to resist flow into the weld area, but also be capable of sufficient flow to allow gaseous egress through the matrix of the adhesive and around the inclusion bodies.

Controlling the escape of the at least one gas produced during weldbonding is of particular importance when performing partial penetration welds. In performing a partial penetration weld a second component to be weldbonded has a finish surface and a working surface. A weld fully penetrates the first component and only partially penetrates the second component from the working surface leaving an unmarred finish on the finish surface. Here the at least one gas must either escape to atmosphere between the components to be weldbonded or escape back through the weld pool, as contrasted to a full penetration weld, where gases may also escape through the back side of the weld. As a result of such limited egress routes, gas production in partial penetration welds tends to lead to welds containing high numbers of imperfections. The present process provides a unique method of allowing the escape of the at least one gas. As the weld area is heated with the welding means, the adhesive in the vicinity of the weld area tends to become less viscous regardless of whether it was initially applied in a paste form or a solid form, such as tape. At the same time, the plurality of gas release and gap sustaining inclusion bodies maintain the desired separation distance between the components. Therefore, as the at least one gas is generated during welding it expands and seeks the path of least resistance to the lower pressure atmosphere. This path is invariably through the matrix of the adhesive, around the inclusion bodies, and between the components, and not back up through the weld pool. The expanding at least one gas forces the viscous adhesive aside as it creates at least one passageway to the surrounding atmosphere between the plurality of inclusion bodies.

In addition to improving the weldbonding method by allowing for the escape of the at least one gas, this method also improves the weld quality by introducing a crack-reducing additive to the weld area. The crack-reducing additive acts to slow down the solidification of the weld pool thereby reducing the likelihood of cracks in the weld pool due to rapid cooling. This is particularly important when welding aluminum alloys, many of which are solidification crack sensitive. Addition of the crack-reducing additive may eliminate the need to use aluminum alloy filler materials. In one of many embodiments, more specifically when weldbonding aluminum alloys including the 6000 series of alloys, the crack-reducing additive is a silicon rich material. The crack-reducing additive may be introduced into the weld area in a number of methods. For example, but not limitation, the crack-reducing additive may be introduced to the weld area in powder form, wire form, foil form, tablet form, or as an integral additive within the adhesive. Alternatively, the inclusion bodies may be made of the crack-reducing additive so as to introduce additional crack-reducing additive into the weld area when they are melted.

The method of the present invention may be used to create welds of any shape and configuration. For example, but not limitation, the method may create linear welds, circular welds, welds of any geometric shape, and spot or point welds of any geometric shape and size.

Welding means as they are disclosed and claimed in the instant invention is intended to include various types of welding, including by way of example and not limitation, resistance welding, laser welding, conductive heat spot welding, conduction arc/plasma welding, ultrasonic welding, through transmission infrared welding, and electron beam welding. In one of numerous variations of the present method the welding means is a laser beam having a variable intensity. The method of the present invention may further include the step of varying the intensity of the laser beam to produce a plurality of heating phases incorporating at least an ablating phase, a welding phase, and an annealing phase, to both prepare the weld area and heat treat the weld pool. The ablating phase serves to ablate a plurality of materials from the weld area prior to the welding phase. The plurality of materials to be ablated may include; but is not limited to; coatings; adhesives; alloying elements of the rigid materials; and grease, dirt, or other impurities in the weld area. These materials are typically removed from the weld area by flaring out of the weld area or by vaporization when exposed to the welding means. The plurality of heating phases serves to improve the material properties of the weld pool and the heat-affected zone, and reduce the imperfections in the weld in a number of ways. For example, the ablating phase, welding phase, and annealing phase may be configured to control the heating rate, cooling rate, and critical microstructure transformation temperatures of the local weld area, in addition to preparing the weld area as previously described. Such control allows the maintenance of the weld pool and heat-affected zone within predetermined temperature ranges for predetermined times. Additionally, this allows control of the solidification time of the weld pool, thereby reducing weld cracking. A preferred embodiment utilizes a single laser beam of variable intensity and pulse rate to achieve the plurality of heating phases. Similar results may be obtained if the welding means were virtually any high-energy beam. The new and novel concept of an ablating phase is not limited to weldbonding and may be effectively applied in the general field of welding.

A further variation of the preceding embodiment, incorporates the strategic use of shielding gases to improve the weld quality and appearance. In one such variation, the shielding gas used during the ablating phase described above is such that it accelerates and/or fuels the ablatement of the plurality of materials. An alternative inert gas shielding gas may then be used during the welding and annealing phases to protect the weld and achieve the desired appearance. The novel use of a shielding gas to accelerate the ablatement phase is not limited to weldbonding and may be effectively applied in the general field of welding.

The method of weldbonding of the present invention may be applied to virtually any rigid components that may be weldbonded. The method has significant applications wherein the plurality of rigid material components, the first rigid material component, and the second rigid material component are composed of metal or metal alloys. Additionally, the present method may be used in joining dissimilar materials. This method significantly advances the field of weldbonding aluminum alloys, and more specifically the widely used 6000 series of aluminum alloy. The method also has significant advantages for joining coated materials.

An additional embodiment of the present invention includes a retaining means. The present method allows the components to be weldbonded to be held together in close proximity, and the relative positions of the components maintained, with a retaining means at any location along the components, or no location at all. The retaining means may include, at least one clamping device or the adhesive may serve as the retaining means.

These variations, modifications, alternatives, and alterations of the various preferred embodiments, processes, and methods may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

Also, in the various figures and drawings, the following reference symbols and letters are used to identify the various elements described herein below in connection with the several figures and illustrations: C1, C2, C1C, C2C, d, FS, G, and WS.

DETAILED DESCRIPTION OF THE INVENTION

The method of weldbonding of the instant invention enables a significant advance in the state of the art. The preferred embodiments of the apparatus accomplish this by new and novel methods that are performed in unique and novel ways and which demonstrate previously unavailable but preferred and desirable capabilities.

The detailed description set forth below in connection with the drawings is intended merely as a description of the presently preferred embodiments of the invention, and is not intended to represent the only method and form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
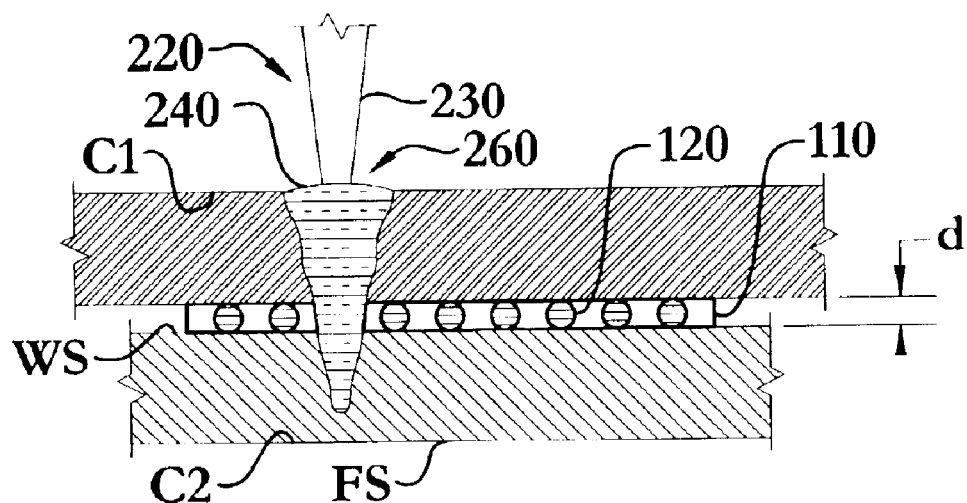
FIG. 1 shows a method of weldbonding wherein the components are shown in a detailed cross-section view, in reduced scale.
Figure 2:
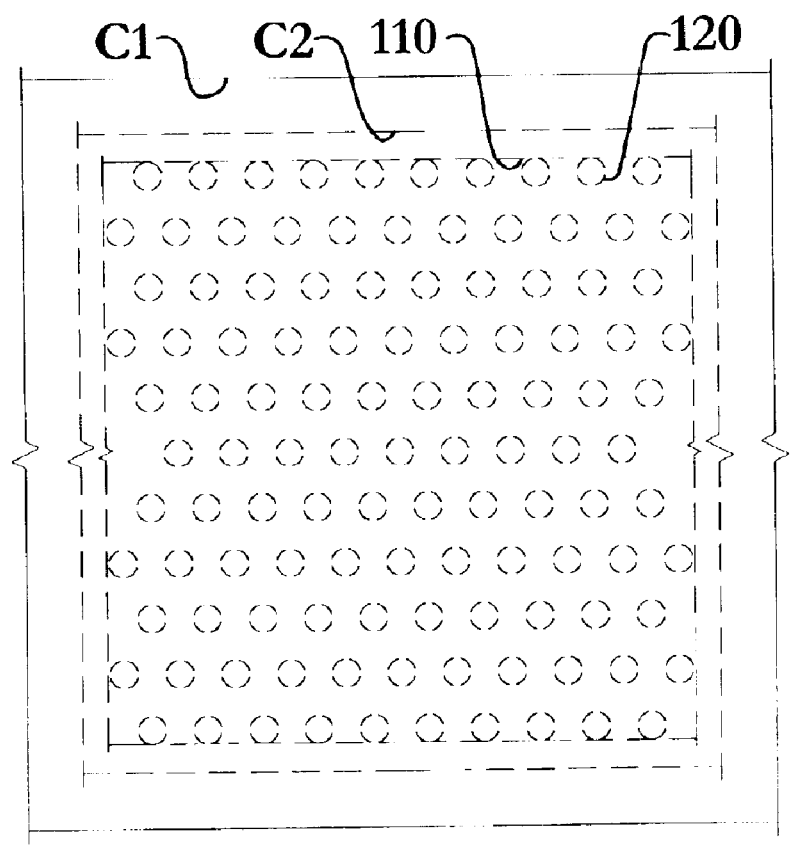
FIG. 2 shows a variation of FIG. 1 in top plan view, in reduced scale.
Figure 8:
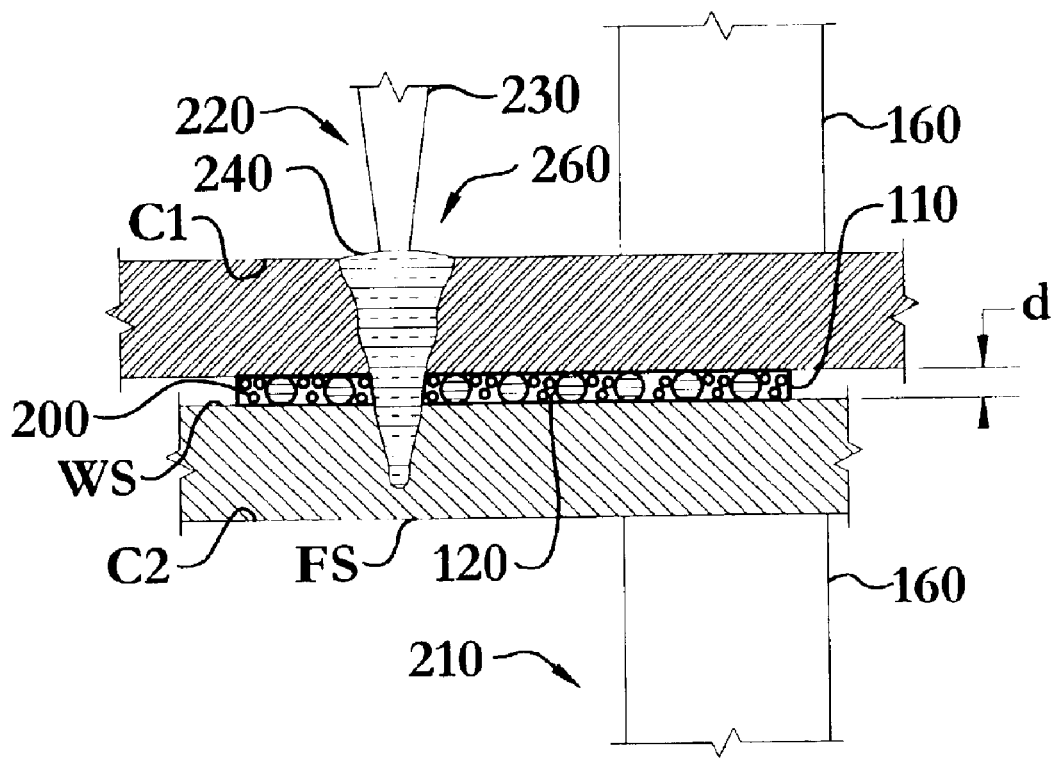
FIG. 8 shows a method of weldbonding wherein the components are shown in a detailed cross-section view, in reduced scale.
Figure 9:
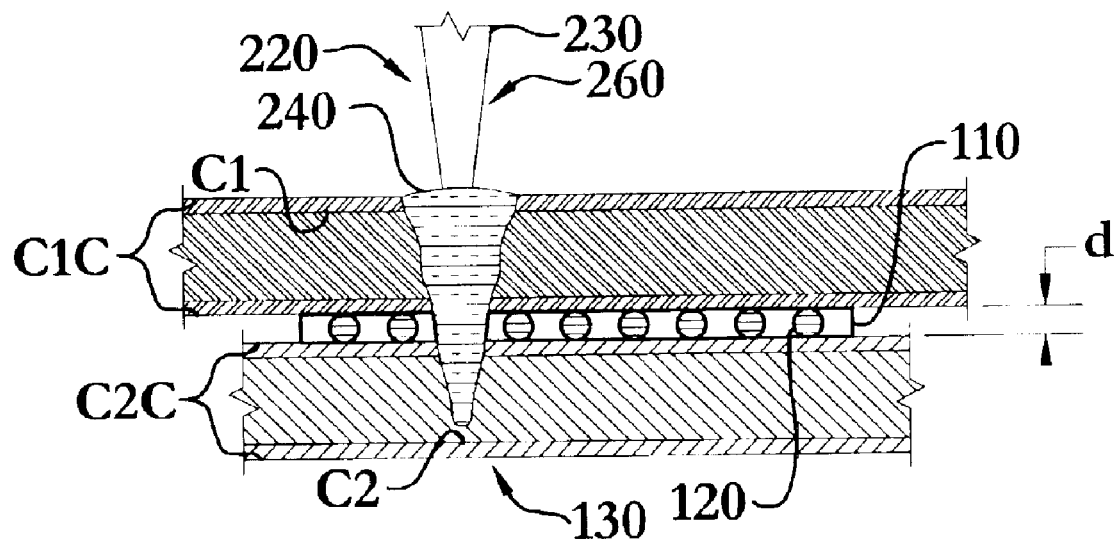
FIG. 9 shows a method of weldbonding wherein the components are shown in a detailed cross-section view, in reduced scale.

With reference now to the accompanying figures and specifically to FIG. 1, in one of the many preferable configurations, the method of weldbonding incorporates, among other steps, applying an adhesive 110 between a first rigid material C1 and a second rigid material C2, the first rigid material optionally having a coating C1C and the second rigid material optionally having a coating C2C, shown in FIG. 9, bringing the first rigid material C1 and the second rigid material C2 into close proximity and maintaining their relative positions with a retaining means 210, shown in FIG. 8, sweeping a weld area 260 with a welding means 220, and providing a plurality of gas release and gap sustaining inclusion bodies 120 between the first rigid material C1 and a second rigid material C2. Welding means as they are disclosed and claimed in the instant invention is intended to include various types of welding, including by way of example and not limitation, resistance welding, laser welding, conductive heat spot welding, conduction arc/plasma welding, ultrasonic welding, through transmission infrared welding, and electron beam welding. The plurality of gas release and gap sustaining inclusion bodies 120 allow at least one gas G generated during the weldbonding process to escape to atmosphere substantially without passing through the weld pool 240 and thereby reducing the quality of the weld 250, shown in FIG. 3 and FIG. 4. With reference to FIG. 4 wherein the first rigid material component C1 has been removed for clarity, the at least one gas G creates at least one passageway 140 around the plurality of gas release and gap sustaining inclusion bodies 120 between the first rigid material component C1 and the second rigid material component C2 allowing the at least one gas G to escape to atmosphere. The new and novel concept of a plurality of gas release and gap sustaining inclusion bodies allowing gas to escape the weld area by creating at least one passageway is not limited to the field of weldbonding and may be effectively applied in the general field of welding.

Figure 3:
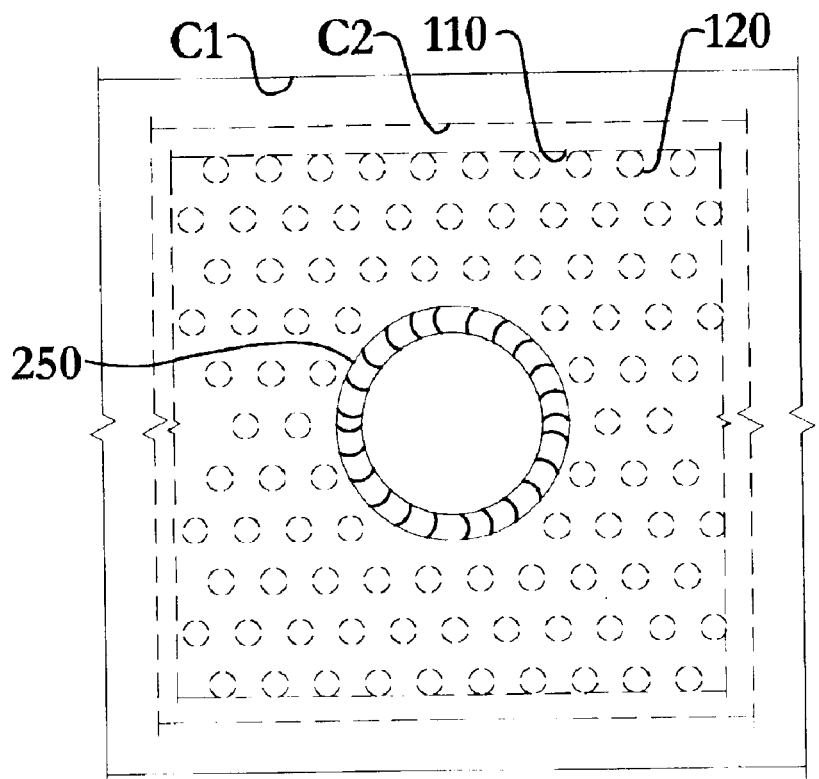
FIG. 3 shows a variation of FIG. 1 in top plan view, in reduced scale.
Figure 4:
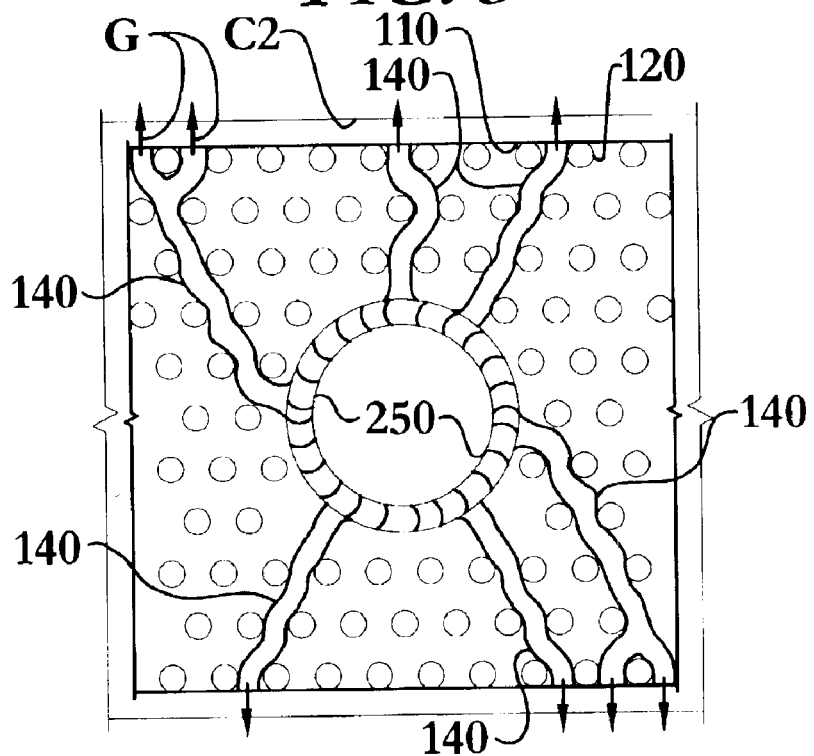
FIG. 4 shows a variation of FIG. 3 in top plan view, in reduced scale, with the first component C1 removed for clarity.

The technology of weldbonding does not require that a weld 250, shown in FIG. 3 and FIG. 4, be made through an adhesive 110, and, as referenced prior, a good deal of attention has been directed in the past to methods of keeping adhesives 110 out of weld areas 260. However, these techniques all add various complications to weldbonding that underscore that an optimal weldbonding method, as in the instant invention, will perform well both with, and without, adhesive 110 in the weld area 260.

If the presence of adhesive in the weld area 260 is not to degrade the practicality and integrity of the welding process, then various properties of the adhesive 110 become very important in the weldbonding process. These properties, by way of example and not limitation, include shelf life, working times, flow characteristics, adhesive strength, and reactions to high temperatures. Generally, both one-part and two-part adhesives may be used in this process. However, one-part adhesives have relatively long curing times and often must be heated to cure, while two-part adhesives have shorter curing times. In general bonding applications, one-part adhesives are often preferred because they have a much longer shelf life than two-part adhesives, however they both have attributes that make them desirable for use in weldbonding.

Referring now to FIG. 3 and FIG. 4, as noted, the most efficient weldbonding process involves completing the weld 250 without regard as to whether the weld 250 is penetrating the weldbonding adhesive 110, or not. To this end, it is necessary to minimize the potential effects of ignition of any adhesive 110 that may be in, or close to, the weld area 260, shown in FIG. 1. One-part adhesives with latent curing additives are particularly prone to ignition when exposed to the welding means 220. This is true, in part, due to the low resistance to flow of the one-part adhesives. For example, during weldbonding with a one-part adhesive, liquefied adhesive 120 flows into the weld area 260 thereby fueling the ignition of the adhesive 110 and reducing the weld 250 quality. It is this same low resistance to flow that allows one-part adhesives to be very easy to apply and workable. Fortunately, rapid curing two-part adhesives have a greatly reduced tendency to ignite when exposed to the welding means 220. Additionally, rapid curing two-part adhesives tend to cure in the vicinity of the weld area 260 when exposed to the welding means 220. Therefore, in one of many preferred embodiments the best qualities of both one-part and two-part adhesives are combined to form a one-part adhesive that substantially cures in the vicinity of the weld area 260 to prevent the flow of adhesive 110 into the weld area 260 while maintaining a workable viscosity and rapid curing. Such an embodiment may include at least one one-part latent curing agent, at least one two-part curing agent, and at least one viscosity and flow modifier. An adhesive 110 including a mixture of up through approximately 15% two-part curing agent and the balance being one-part curing agent augmented with viscosity and flow modifiers possesses the desired properties described above. Alternatively, the adhesive 110 may be applied in a solid form such as a tape. In addition to minimizing adhesive 110 flow into the weld area 260, the importance of the presence or absence of adhesive 110 in the weld area 260 is further reduced by providing for a method of venting the at least one gas G and gaseous byproducts of the welding process as may occur. These gas and gaseous byproducts include, by way of example and not limitation, vaporized elements from the materials, C1 and C2, to be joined and from any coatings C1C and C2C that may be present on the materials C1 and C2. Additionally, the at least one gas and associated gaseous byproducts could be supplemented, by way of example and not limitation, by combustion or vaporization products from any adhesive 110 or other material that may be in the weld area 260. The instant invention provides for inclusion bodies 120 between the surfaces of the materials to be joined. These inclusion bodies 120 tend to maintain a gap, having a separation d, shown in FIG. 1, between the materials, C1 and C2, which may optionally bear coatings C1C and C2C, to be joined to allow the lateral release of the at least one gas G that may be generated, as shown in FIG. 4.

Referring still to FIG. 4, in addition to manipulation of the tendency of any adhesive 110 to flow into the weld area 260 and the provision for gaseous egress by the plurality of gas release and gap sustaining inclusion bodies 120, the viscosity and curing properties of the adhesive 110 are important to allowing the escaping at least one gas G to create the at least one passageway 140. Referring now to FIG. 9, the at least one gas G is created by vaporization of a plurality of materials 130 during the melting of the rigid material components, C1 and C2, the adhesive 110, and the plurality of gas release and gap sustaining inclusion bodies 120. Perhaps the largest contributors to the creation of the at least one gas G are the burning of any optional protective coatings C1C and C2C, applied to the rigid material components C1 and C2, the burning of the adhesive 110, and the boiling away of alloying elements. For example, aluminum alloys are often coated with a protective layer of chromate that produces gases that must escape the weld area when burned. Similarly, sheet steel often possesses zinc-based coatings. Additionally, magnesium and other elements in aluminum alloy are often vaporized during heating of the alloy, creating gas that must escape the weld area.

The method of substantially controlling the escape of the at least one gas G produced during weldbonding is essential in creating a reproducible quality weld 250. Referring again to FIG. 1, the present invention substantially controls the release of the at least one gas G through the use of a plurality of gas release and gap sustaining inclusion bodies 120. The plurality of gas release and gap sustaining inclusion bodies 120 maintain a separation distance d between the first rigid material component C1 and the second rigid material component C2, and any optional coatings present, C1C and C2C, of between approximately 0.001 inches and approximately 0.020 inches. The separation distance d may be varied by varying the size of the inclusion bodies 120 and can vary depending on the desired adhesive thickness as well as the amount of the at least one gas G that is expected, among other variables. The plurality of gas release and gap sustaining inclusion bodies 120 may be of virtually any shape. For example, but not limitation, the inclusion bodies may be spherical, as shown in all of the accompanying figures, cubic, prismatic, cylindrical, conical, pyramidal, frustum sections thereof, and virtually any other volumetric configuration. Further, while the inclusion bodies 120 may be constructed of any number of materials, in one of many preferred embodiments the inclusion bodies 120 are made of silica. When adhesive 110 fills the space between the materials C1 and C2 to be joined, the inclusion bodies 120 preserve a potential, rather than an open, channel for gaseous egress, as the matrix of the adhesive 110 will fill the interstices between inclusion bodies 120. Therefore, the adhesive 110, as in the instant invention, must be sufficiently flow resistant to resist flow into the weld area 260, but also be capable of sufficient flow to allow gaseous egress through the matrix of the adhesive 110 and around the inclusion bodies 120.

Controlling the escape of the at least one gas G produced during weldbonding is of particular importance when performing partial penetration welds. As shown in FIG. 1, in performing a partial penetration weld a second component C2 to be weldbonded has a finish surface FS and a working surface WS. A weld fully penetrates the first component C1 and any optional coating present, C1C, but only partially penetrates the second component C2 and any optional coating present, C2C, from the working surface WS leaving an unmarred finish on the finish surface FS. Here the at least one gas G must either escape to atmosphere between the components, C1 and C2, to be weldbonded or escape back through the weld pool 240, as contrasted to a full penetration weld, where gases may also escape through the back side of the weld. As a result of such limited egress routes, gas production in partial penetration welds tends to lead to welds containing high numbers of imperfections. The present process provides a unique method of allowing the escape of the at least one gas G. As the weld area 260 is heated with the welding means 220, the adhesive 110 in the vicinity of the weld area 260 tends to become less viscous regardless of whether it was initially applied in a paste form or a solid form, by way of example and not limitation, such as tape. At the same time, the plurality of gas release and gap sustaining inclusion bodies 120 maintain the desired separation distance d between the components, C1 and C2. Therefore, as the at least one gas G is generated during welding it expands and seeks the path of least resistance to the lower pressure atmosphere. This path is invariably through the matrix of the adhesive 110, around the inclusion bodies 120, and between the components C1 and C2, and not back up through the weld pool 240. The expanding at least one gas G forces the viscous adhesive 110 aside as it creates at least one passageway 140 to the surrounding atmosphere between the plurality of inclusion bodies 120.

Figure 5:
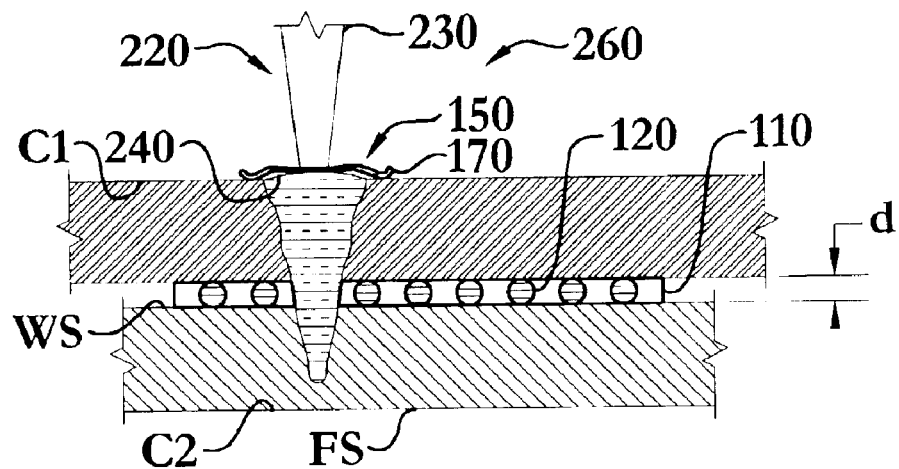
FIG. 5 shows a method of weldbonding wherein the components are shown in a detailed cross-section view, in reduced scale.
Figure 6:
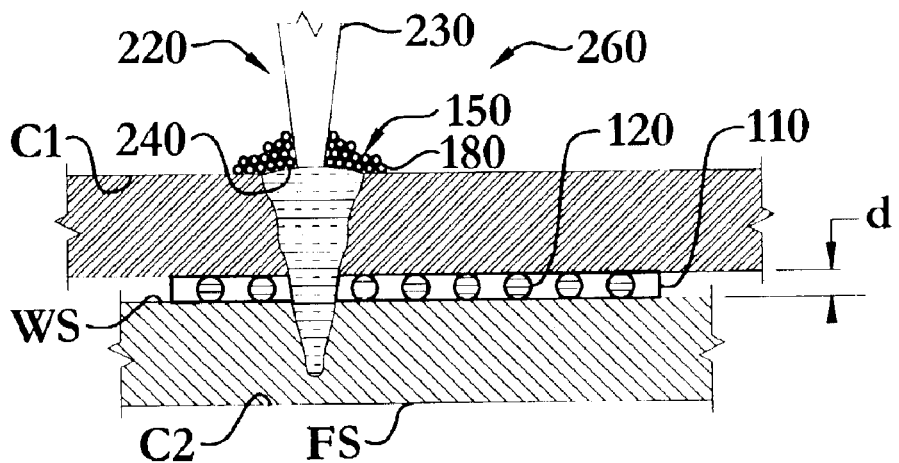
FIG. 6 shows a method of weldbonding wherein the components are shown in a detailed cross-section view, in reduced scale.
Figure 7:
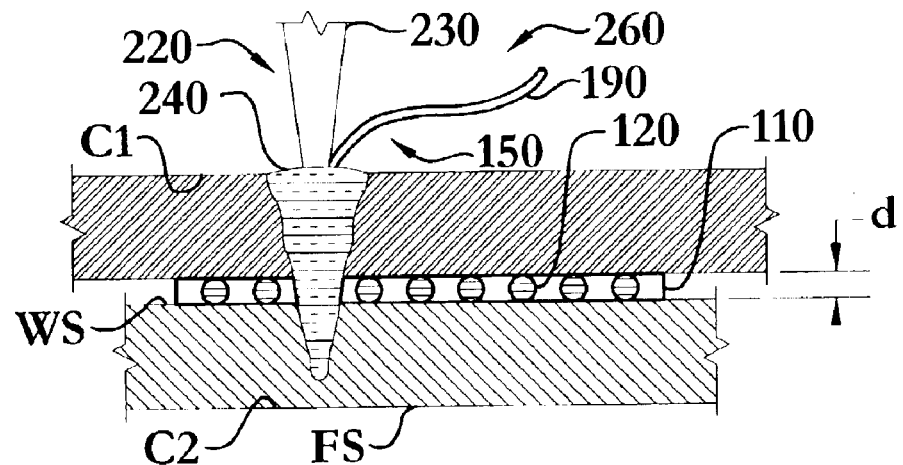
FIG. 7 shows a method of weldbonding wherein the components are shown in a detailed cross-section view, in reduced scale.

In addition to improving the weldbonding method by allowing for the escape of the at least one gas G, the instant invention also improves the weld quality by introducing a crack-reducing additive 150 to the weld area 260. The crack-reducing additive 150 acts to slow down the solidification of the weld pool 240, thereby reducing the likelihood of cracks in the weld pool 240 due to rapid cooling. This is particularly important when welding aluminum alloys, many of which are solidification crack sensitive. Addition of the crack-reducing additive 150 may eliminate the need to use aluminum alloy filler materials. In one of many embodiments, more specifically when weldbonding aluminum alloys including the 6000 series of alloys, the crack-reducing additive 150 is a silicon rich material. The crack-reducing additive 150 may be introduced into the weld area 260 in a number of methods. For example, but not limitation, the crack-reducing additive 150 may be introduced to the weld area 260 in powder form 180, shown in FIG. 6, wire form 190, as shown in FIG. 7, foil form 170, as shown in FIG. 5, tablet form, not shown, or as an integral additive 200 within the adhesive 110, as shown in FIG. 8. Alternatively, the inclusion bodies 120 may be made of the crack-reducing additive 150 so as to introduce additional crack-reducing additive 150 into the weld pool 240 when it is melted.

The method of the present invention may be used to create welds of any shape and configuration. For example, but not limitation, the method may create linear welds, circular welds, as shown in FIG. 3 and FIG. 4, welds of any geometric shape, and spot or point welds of any geometric shape and size.

Referring again to FIG. 1, in one of numerous variations of the present method the welding means 220, is a laser beam 230 having a variable intensity. The method of the present invention may further include the step of varying the intensity of the laser beam 230 to produce a plurality of heating phases incorporating at least an ablating phase, a welding phase, and an annealing phase to both prepare the weld area and heat treat the weld pool 240. The ablating phase serves to remove a plurality of materials 130 from the weld area 260 prior to the welding phase. The plurality of materials 130 may include, but is not limited to, coatings, C1C and C2C, adhesive 110, alloying elements of the rigid materials, and grease, dirt, or other impurities in the weld area 260. These materials 130 are typically removed from the weld area 260 by flaring out of the weld area 260 or by vaporization when exposed to the welding means 220. The plurality of heating phases serves to improve the material properties of the weld pool 240 and the heat-affected zone, and reduce the imperfections in the weld 250 in a number of ways. For example, the ablating phase and annealing phase may be configured to control the heating rate, cooling rate, and critical microstructure transformation temperatures of the local weld area 260, in addition to preparing the weld area as previously described. Such control allows the maintenance of the weld pool 240 and heat-affected zone within predetermined temperature ranges for predetermined times. Additionally, this allows control of the solidification time of the weld pool 240 thereby reducing weld cracking. A preferred embodiment utilizes a single laser beam 230 of variable intensity and pulse rate to achieve the plurality of heating phases. Similar results may be obtained if the welding means were virtually any high-energy beam. The new and novel concept of an ablating phase is not limited to weldbonding and may be effectively applied in the general field of welding.

A further variation of the preceding embodiment, incorporates the strategic use of shielding gases to improve the weld quality and appearance. In one such variation, the shielding gas used during the ablating phase described above is such that it accelerates and/or fuels the removal of the plurality of materials 130. Such shielding gases include oxygen and oxygen mixtures. An alternative inert gas shielding gas, such as argon, may then be used during the welding and annealing phases to protect the weld and achieve the desired appearance. The novel use of a shielding gas to accelerate the ablatement phase is not limited to weldbonding and may be effectively applied in the general field of welding.

The method of weldbonding of the present invention may be applied to virtually any rigid components that may be weldbonded. The method has significant applications wherein the plurality of rigid material components, the first rigid material component C1, and the second rigid material component C2 are composed of metal or metal alloys. Additionally, the present method may be used in joining dissimilar materials. This method significantly advances the field of weldbonding aluminum alloys, and more specifically the widely used 6000 series of aluminum alloy. The method also has significant advantages for joining materials bearing coatings, C1C and C2C as illustrated in FIG. 9.

Referring now to FIG. 8, an additional embodiment of the present invention includes a retaining means 210. The present method allows the components, C1 and C2, to be weldbonded to be held together in close proximity, and the relative positions of the components, C1 and C2, maintained, with a retaining means 210 at any location along the components, C1 and C2, or no location at all. The retaining means 210 may include at least one clamping device 160 or, alternatively, the adhesive may serve as the retaining means 210.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

We claim:

1. A method of weldbonding a plurality of rigid material components, the method comprising:

applying an adhesive between a first rigid material component and a second rigid material component;

bringing the first rigid material and the second rigid material into close proximity and maintaining the relative position of the first rigid material and the second rigid material with a retaining means;

sweeping a weld area with a welding means causing melting, wherein the weld area includes a portion of the adhesive; and providing a plurality of gas release and gap sustaining inclusion bodies between the first rigid material component and the second rigid material component whereby at least one gas generated by vaporization of a plurality of materials during the melting of the plurality of rigid material components, the adhesive, and the plurality of gas release and gap sustaining inclusion bodies, create at least one passageway between the first rigid material component and the second rigid material component.

2. The method according to claim 1, wherein the welding means is a laser beam having a variable intensity.

3. The method according to claim 1, further comprising the step of introducing a crack-reducing additive to the weld area.

4. The method according to claim 3, wherein the crack-reducing additive is an integral additive that is integral to the adhesive designed to be liquefied by the welding means and incorporated into the weld area to slow down the solidification of the weld thereby reducing cracking in the weld area.

5. The method according to claim 2, further comprising the step of varying the intensity of the laser beam to produce a plurality of heating phases on the weld area incorporating at least an ablating phase, a welding phase, and an annealing phase.

6. The method according to claim 1, wherein the plurality of gas release and gap sustaining inclusion bodies are substantially spherical.

7. The method according to claim 1, wherein the plurality of gas release and gap sustaining inclusion bodies maintain a separation distance between the first rigid material component and the second rigid material component of between approximately 0.001 inches and approximately 0.020 inches.

8. The method according to claim 1, wherein the plurality of gas release and gap sustaining inclusion bodies are substantially constructed of silica.

9. The method according to claim 1, wherein the plurality of gas release and gap sustaining inclusion bodies is integral to the adhesive whereby the at least one gas generated by vaporization can escape from between the plurality of rigid material components to a surrounding atmosphere by forcing the adhesive away from the at least one gas thus creating at least one gas escape passageway between the inclusion bodies.

10. The method according to claim 2, wherein the adhesive is a rapid-curing adhesive that substantially cures around the weld area when exposed to the laser beam.

11. The method according to claim 2, wherein the adhesive contains at least one one-part latent curing agent, at least one two-part curing agent, and at least one viscosity and flow modifier.

12. The method according to claim 1, wherein the plurality of rigid material components, the first rigid material component, and the second rigid material component are composed of metal or metal alloys.

13. The method according to claim 1, wherein the plurality of rigid material components, the first rigid material component, and the second rigid material component are composed of aluminum alloy.

14. The method according to claim 13, wherein the plurality of rigid material components, the first rigid material component, and the second rigid material component are composed of 6000 series aluminum alloy.

15. The method according to claim 1, wherein the retaining means comprises at least one clamping device.

16. The method according to claim 1, wherein the retaining means is provided by the adhesive applied between the first rigid material component and the second rigid material component.

17. A method of weldbonding a plurality of aluminum alloy components, the method comprising:
applying an adhesive between a first aluminum alloy component and a second aluminum alloy component;
bringing the first aluminum alloy component and the second aluminum alloy component into close proximity and maintaining the relative position of the first aluminum alloy component and the second aluminum alloy component with a retaining means;
sweeping a weld area with a welding means causing melting, wherein the weld area includes a portion of the adhesive; and
providing a plurality of gas release and gap sustaining inclusion bodies between the first aluminum alloy component and the second aluminum alloy component whereby at least one gas generated by vaporization of a plurality of materials during the melting of the first aluminum alloy component, the second aluminum alloy component, the adhesive, and the plurality of gas release and gap sustaining inclusion bodies, create at least one passageway between the first aluminum alloy component and the second aluminum alloy component.

18. The method according to claim 17, wherein the welding means is a laser beam having a variable intensity.

19. The method according to claim 17, further comprising the step of introducing a crack-reducing additive to the weld area.

20. The method according to claim 19, wherein the crack-reducing additive is a silicon rich material.

21. The method according to claim 19, wherein the crack-reducing additive is an integral additive that is integral to the adhesive designed to be liquefied by the welding means and incorporated into the weld area to slow down the solidification of the weld area thereby reducing cracking in the weld.

22. The method according to claim 18, further comprising the step of varying the intensity of the laser beam to produce a plurality of heating phases on the weld area incorporating at least an ablating phase, a welding phase, and an annealing phase.

23. The method according to claim 17, wherein the plurality of gas release and gap sustaining inclusion bodies are substantially spherical.

24. The method according to claim 17, wherein the plurality of gas release and gap sustaining inclusion bodies maintain a separation distance between the first rigid aluminum alloy component and the second aluminum alloy component of between approximately 0.001 inches and approximately 0.020 inches.

25. The method according to claim 17, wherein the plurality of gas release and gap sustaining inclusion bodies are substantially constructed of silica.

26. The method according to claim 17, wherein the plurality of gas release and gap sustaining inclusion bodies is integral to the adhesive whereby the at least one gas generated by vaporization can escape from between the plurality of aluminum alloy components to a surrounding atmosphere by forcing the adhesive away from the at least one gas thus creating at least one gas escape passageway between the inclusion bodies.

27. The method according to claim 17, wherein the adhesive is a rapid-curing adhesive that substantially cures around the weld area when exposed to the laser beam.

28. The method according to claim 17, wherein the adhesive contains at least one one-part latent curing agent, at least one two-part curing agent, and at least one viscosity and flow modifier.

29. The method according to claim 17, wherein the retaining means comprises at least one clamping device.

30. The method according to claim 17, wherein the retaining means is provided by the adhesive applied between the first rigid aluminum alloy component and the second aluminum alloy component.

31. A method of laser weldbonding a first aluminum alloy component and a second aluminum alloy component, having a finish surface and a working surface, whereby a weld fully penetrates the first aluminum alloy component and partially penetrates the second aluminum alloy component from the working surface, producing an unmarred finish on the finish surface of the second aluminum alloy component, the method comprising:
applying an adhesive between the first aluminum alloy component and the second aluminum alloy component;
bringing the first aluminum alloy component and the second aluminum alloy component into close proximity and maintaining the relative position of the first aluminum alloy component and the second aluminum alloy component with a retaining means;
sweeping a weld area with a laser welding beam having variable intensity causing melting, wherein the weld area includes a portion of the adhesive; and
providing a plurality of gas release and gap sustaining inclusion bodies between the first aluminum alloy component and the second aluminum alloy component whereby at least one gas generated by vaporization of a plurality of materials during the melting of the first aluminum alloy component, the second aluminum alloy component, the adhesive, and the plurality of gas release and gap sustaining inclusion bodies, create at least one passageway between the first aluminum alloy component and the second aluminum alloy component, such that the weld fully penetrates the first aluminum alloy component and partially penetrates the second aluminum alloy component from the working surface, producing an unmarred finish on the finish surface of the second aluminum alloy component.

32. The method according to claim 31, further comprising the step of introducing a crack-reducing additive to the weld area.

33. The method according to claim 32, wherein the crack-reducing additive is a silicon rich material.

34. The method according to claim 32, wherein the crack-reducing additive is an integral additive that is integral to the adhesive designed to be liquefied by the welding means and incorporated into the weld area to slow down the solidification of the weld thereby reducing cracking in the weld area.

35. The method according to claim 31, further comprising the step of varying the intensity of the laser beam to produce a plurality of heating phases on the weld area incorporating at least an ablating phase, a welding phase, and an annealing phase.

36. The method according to claim 31, wherein the plurality of gas release and gap sustaining inclusion bodies are substantially spherical.

37. The method according to claim 31, wherein the plurality of gas release and gap sustaining inclusion bodies maintain a separation distance between the first rigid aluminum alloy component and the second aluminum alloy component of between approximately 0.001 inches and approximately 0.020 inches.

38. The method according to claim 31, wherein the plurality of gas release and gap sustaining inclusion bodies are substantially constructed of silica.

39. The method according to claim 31, wherein the plurality of gas release and gap sustaining inclusion bodies is integral to the adhesive whereby the at least one gas generated by vaporization can escape from between the plurality of aluminum alloy components to a surrounding atmosphere by forcing the adhesive away from the at least one gas thus creating at least one gas escape passageway between the inclusion bodies.

40. The method according to claim 31, wherein the adhesive is a rapid-curing adhesive that substantially cures around the weld area when exposed to the laser beam.

41. The method according to claim 31, wherein the adhesive contains at least one one-part latent curing agent, at least one two-part curing agent, and at least one viscosity and flow modifier.

42. The method according to claim 31, wherein the retaining means comprises at least one clamping device.

43. The method according to claim 31, wherein the retaining means is provided by the adhesive applied between the first rigid aluminum alloy component and the second aluminum alloy component.

* * * * *